May 3, 1960 — S. D. ROSS ET AL — 2,935,667
STABILIZED DIELECTRIC COMPOSITIONS
Filed Dec. 5, 1955
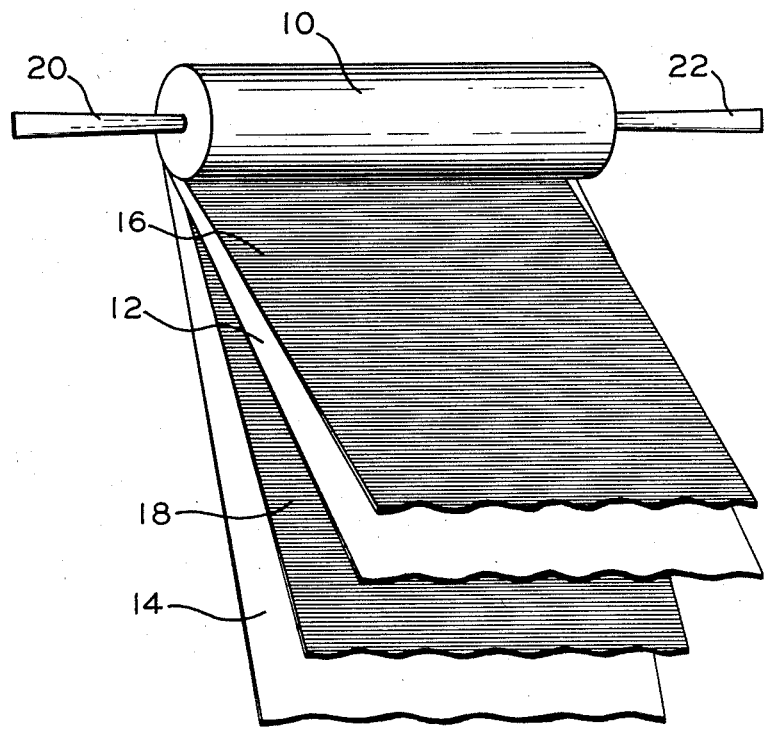
INVENTORS
SIDNEY D. ROSS
BY WILLIAM M. ALLISON
Roland A. Dexter
THEIR ATTORNEY

2,935,667
STABILIZED DIELECTRIC COMPOSITIONS

Sidney D. Ross and William M. Allison, Williamstown, Mass., assignors to Sprague Electric Company, North Adams, Mass., a corporation of Massachusetts Application December 5, 1955, Serial No. 550,984

4 Claims. (Cl. 317—258)

This invention relates to new and improved dielectric compositions and more specifically refers to dielectric compositions having exceptional stability in electrical capacitors.

Castor oil has been used as a dielectric for a number of years where its combination of characteristics can be put to good advantage. The principal advantage of the castor oil is its relatively high dielectric constant. Being a liquid throughout the normal operating range, it possesses fairly high dielectric strength and can be purified readily by treatment with fuller's earth or other known materials. The conductivity of castor oil is tolerable when properly handled and processed. When used as a dielectric impregnant in paper capacitors, it will give good service in ambient temperatures up to about 65° C. At higher temperatures such as 85° C., which are commonly met in actual use, the life of the normal castor oil capacitor is somewhat limited due to some type of deterioration which leads to lowered insulation resistance and failure of the capacitors.

It is an object of this invention to overcome the foregoing and related disadvantages. A further object is to produce novel electrical capacitors impregnated with high dielectric constant dielectric liquids. A still further object is to produce electrical capacitors with a maximum capacity per unit volume capable of operation at elevated temperatures. Additional objects will become apparent from the following description and claims.

The sole figure of the drawing portrays a partially unrolled electrical capacitor impregnated with the stabilized dielectric of this invention.

These objects are attained in accordance with the present invention wherein there is produced a capacitor impregnated with a dielectric composition comprising predominant amounts of the glycerides of both saturated and unsaturated fatty acids and a small amount of an organic material which will inhibit deterioration of these glycerides.

In a more restricted sense the invention is concerned with a capacitor dielectric composition comprising castor oil containing from about 0.1% to about 5% of benzil and low alkyl substituted derivatives thereof.

Primary dielectric compositions which may be modified and substantially improved in accordance with our invention comprise generally the glycerides of unsaturated fatty acids such as ricinoleic and isorisinoleic acids, and saturated fatty acids such as stearic and arachidic acids. Further examples are rape oil, sesame oil, tung oil, hydrogenated castor oil. It is to be understood that substituted fatty acid glycerides can be used with the invention. The chemical composition of these compounds can also be modified by hydrogenation of existing double bonds and by dehydration of the fatty acid units containing the OH substituent. The preferred compound from a cost and availability standpoint is castor oil, but the invention is equally applicable to the numerous other liquids of the same general chemical type as indicated above.

Numerous stabilizers are useful with the dielectric compositions set forth above and include the quinones, aromatic nitro compounds, aromatic nitroso substituted compounds, but the preferred class which has been found to be particularly useful with the glycerides of unsaturated fatty acids are certain aromatic diketones. In particular, these aromatic diketones are benzil and lower alkyl substituted derivatives thereof. These derivatives include p-p'-dimethyl benzil, 4,4'-diisopropyl benzil and p-p'-diphenyl benzil.

The diketone benzil has also been found to be a very effective compound for use in accordance with the present invention. Alkyl substituted derivatives thereof are desirable for use to improve the solubility in the dielectric composition through the operating range.

The quantity of stabilizer added to the liquid dielectric to give the final impregnating composition is normally from about 0.1% to about 5%. The preferred range of operation is from about 0.5% to about 3%.

As typical examples of the practice of our invention, capacitors were made up with calendered kraft condenser tissue and aluminum foil to provide test sections which upon impregnation would have capacity values on the order of 1 mfd. Such a capacitor is set forth as the sole drawing in which it is shown as a partly unrolled section. The section 10 is seen to be convolutely wound with alternate layers of electrode foils 12 and 14 which are separated by porous spacers 16 and 18 such as kraft paper. The porous spacers 16 and 18 are impregnated with the dielectric stabilizers in accordance with the teachings of this invention. The tabs 20 and 22 which make contact with the respective electrodes are shown as projecting from the ends of the convolutely wound section 10. Half of the units were impregnated by vacuum techniques with unstabilized castor oil, while the other half were impregnated with the same castor oil in which had been dissolved 1% benzil.

Life tests were conducted in an ambient temperature of 85° C. with an initial voltage gradient of 800 volts per mil in the case of the six control capacitors and nine special units. After 250 hours under test, two of the standard series had shorted, while after 500 hours, a third unit had shorted. With the stabilized capacitors, where were no shorts during the first 250 hours and only two occurred during the entire 500 hours. Thus 50% of the control units failed, while only 22% of the stabilized units failed, and none of these during the first 250 hours.

The above data indicates the considerable increase in capacitor life at 85° C., showing that the stabilized dielectric composition in the capacitor assembly permits improved operation of the capacitors at 85° C. ambient temperature, which heretofore had not been possible.

As a further example of the scope of this invention, aluminum foil and paper spacer units having a nominal capacity of 0.47 mfd. and rated at 400 volts D.C. were prepared. In particular the spacers consisted of kraft paper of 0.00025" thickness; for the total dielectric between the adjacent electrodes, three such sheets were utilized. Units were prepared with the impregnants consisting of castor oil to which was added 1% by weight of 4,4'-diisopropyl benzil; castor oil to which was admixed 1% by weight of benzil; castor oil to which was admixed 1% by weight of p,p'-dimethyl benzil. When exposed to an operating potential of 1½ times the rated voltage, that is 600 volts D.C., at a temperature of 65° C., the above units were remarkable in their operating lifetime. From the results, it appears that we can safely predict useful capacitors of lifetimes extending far beyond one year of continuous duty. The reason for this remarkable characteristic of the combination of castor oil and the limited stabilizing class which we have disclosed herein appears to be that the stabilization of castor oil results in a totally unpredictable extension of operational life, which extension is unpredictable in view of the known literature. Concurrent with this remarkably extended lifetime is a complete absence of deterioration of the electrical characteristics of the device over that of the initial structure.

The metal electrodes which may be employed for the capacitor structure include lead, zinc, tin, copper, silver, and the like, as well as alloys of these metals. The electrode may consist of a rolled metal film or of a sprayed or deposited film on the dielectric spacer.

The dielectric spacer may as aforesaid consist of a calendered kraft paper or may consist of other known dielectric materials. Other dielectric spacers include papers and separators made from regenerated cellulose, polyacrylonitrile, fibers made from polyamides, fibers made from polyesters, glass fiber, mica paper and the like. The housing of the capacitor may be of metal or plastic depending upon the size and application for the finished unit.

As many widely different embodiments of this invention may be made without departing from the spirit and scope thereof, it is to be understood that the invention is not limited to the specific embodiments hereof except as defined in the appended claims.

This application forms a continuation-in-part of United States patent application, Serial No. 276,465, filed March 13, 1952, and later abandoned.

We claim:

1. A capacitor having a long operational life comprising a plurality of electrodes separated by a porous dielectric material, said dielectric material substantially completely impregnated with a dielectric material of uniform operational stability over an extended period of time with sustained resistivity comprising a substantially major portion of glycerides of saturated and unsaturated fatty acids and from about 0.1% to about 5% of an inhibitor compound of the class consisting of benzil, p-p'-dimethyl benzil and 4,4'diisopropyl benzil.

2. The capacitor of claim 1 wherein said major portion is castor oil and said inhibitor is benzil.

3. The capacitor of claim 1 wherein said inhibitor is p-p'-dimethyl benzil.

4. The capacitor of claim 1 wherein said inhibitor is 4,4'-diisopropyl benzil.

References Cited in the file of this patent

UNITED STATES PATENTS

| | | |
|---|---|---|
| 1,776,309 | Clark | Sept. 23, 1930 |
| 2,377,630 | Hyde | June 5, 1945 |
| 2,473,242 | Clark | June 14, 1949 |
| 2,492,335 | Chenicek | Dec. 27, 1949 |
| 2,525,473 | Berberich et al. | Oct. 10, 1950 |

OTHER REFERENCES

"Stabilization of Dielectrics," by H. A. Sauer et al., Industrial and Engineering Chemistry, vol. 44, #1, pp. 135–140, January 1952.